March 3, 1964

D. W. EXLINE 3,123,057

VALVE CHAMBER STRUCTURE

Filed Aug. 12, 1963

INVENTOR.
DOUGLAS W. EXLINE
BY
Fishburn and Gold
ATTORNEYS

United States Patent Office

3,123,057
Patented Mar. 3, 1964

3,123,057
VALVE CHAMBER STRUCTURE
Douglas W. Exline, Salina, Kans., assignor to Exline, Inc., Salina, Kans., a corporation of Kansas
Filed Aug. 12, 1963, Ser. No. 301,522
9 Claims. (Cl. 123—41.77)

This invention relates to internal combustion engines, and more particularly to valve chamber structures for such engines and especially for large stationary engines that furnish power, drive pumps, compressors and the like.

In large internal combustion engines, it is necessary to provide various portions, such as cylinders, cylinder heads and the like with water jackets or such structure that water passages or water areas substantially surround the walls exposed to heat in order to dissipate the heat and keep the operating temperatures within a suitable range. Valve chambers, and particularly the exhaust valve, valve seat and valve chamber, are subjected to high heat as the burning gases are exhausted from the engine cylinders. Such heat results in wear, warpage and the like whereby the valves and chamber members and valve seat members may need to be replaced periodically and, therefore, in such engines, it has become customary to make the valve chamber structure such that the valve seat portions are separate and replaceable, thereby reducing the cost of maintenance by making it necessary only to replace the seat portion instead of an entire valve chamber structure. Heretofore, it has been the practice to provide a valve chamber structure and the valve seat portion thereof with internal cavities and communicating ports to form water jackets and flow passages to cool the valve chamber and seat. However, the water-containing areas around the valve seats are necessarily limited and thereby small due to the space available and also most cooling water available at the engine site has impurities that in the high heat zone adjacent the valve seat the water forms deposits that fills the water-containing areas of the seat portion and adjacent portions. Attempts have been made to clean or remove the scale and deposits from said water-containing areas or jackets, but the access ports are so small that it is substantially impossible, and at least impractical, to properly clean the valve chamber water jackets, with the result that the valve chamber structure must be replaced.

The principal objects of the present invention are to provide a valve chamber structure for internal combustion engines that can be installed on the engine cylinders without change therein, said valve chamber structure having an arrangement that provides for access to the water jacket around the valve seat whereby the deposits and scale can be removed therefrom and thereby eliminate the above-mentioned difficulties and replacement expense; to provide such a valve chamber structure with a seat-defining portion adapted to sealingly engage a cylinder wall of a valve port wherein the cylinder has outwardly extending portions therefrom on which the valve chamber is secured, forming spaced sealed connections whereby the walls define water flow passages having communication with the cylinder water jacket and with the water jacket in the valve chamber structure; to provide such a valve chamber structure wherein there are inner and outer sections that are sealingly joined substantially on a line of the mounting of the chamber structure on the cylinder extension with the inner section having the valve seat insert therein; to provide such a valve chamber structure wherein the inner and outer sections have radially spaced walls that are sealingly connected and define the communicating water jackets thereof; and to provide a valve chamber structure that is economical to manufacture, easily installed and removed and having separable sections providing access to the water jackets for facilitating cleaning of scale and deposits therefrom.

Other objects and advantages of this invention will become apparent from the following description taken in connection with the accompanying drawings wherein are set forth by way of illustration and example certain embodiments of this invention.

Figure 1:
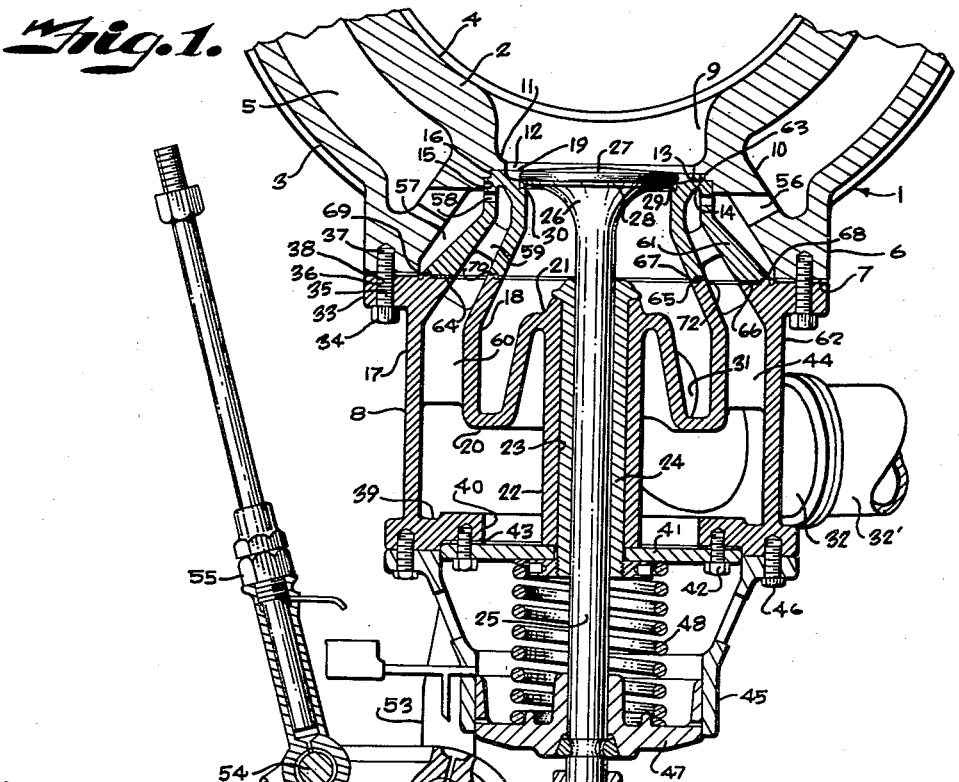
FIG. 1 is a partial sectional view through an internal combustion engine showing the exhaust valve chamber and operating gear.
Figure 2:
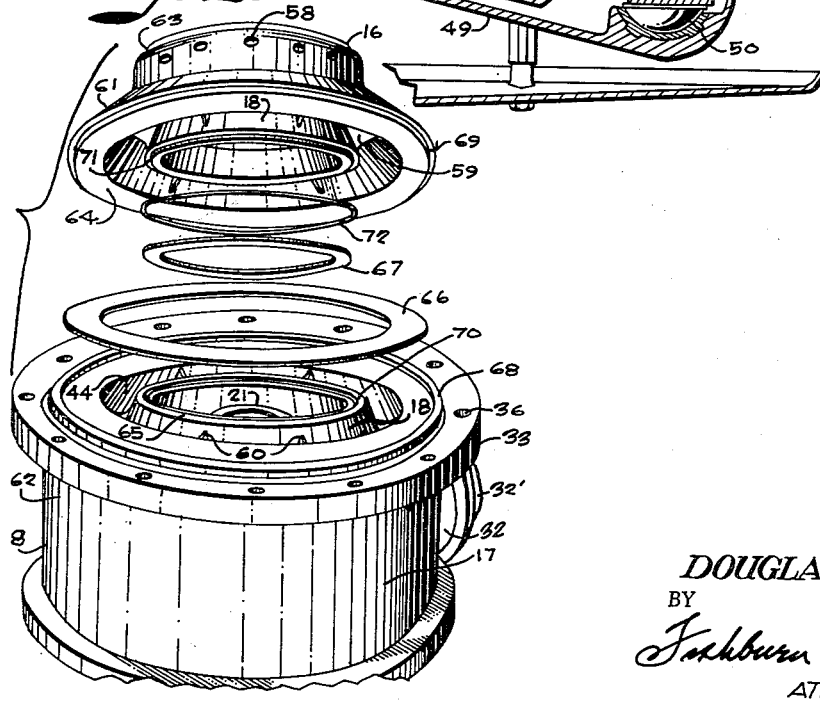
FIG. 2 is a disassembled perspective view of the exhaust valve chamber structure and seal members therefor.

Referring more in detail to the drawings:

The reference numeral 1 generally designates an internal combustion engine cylinder having an inner wall 2 and a radially outwardly spaced outer wall 3 wherein the inner wall defines a piston-receiving bore 4 and the space between the inner and outer walls 2 and 3 respectively defines a water-containing area or jacket 5 that substantially surrounds the inner wall 2. The engine may be of any conventional structure, as for example of a type manufactured and sold by the Cooper-Bessemer Corporation of Mt. Vernon, Ohio, and, in the illustrated structure, the cylinder 1 has a laterally extending boss or extension 6 in the form of a boss with an outer face 7 to which is secured a valve chamber structure 8, as later described.

The inner wall 2 has a valve-receiving cavity 9 associated with the extension 6 and the inner wall surrounding the cavity is connected by a laterally outwardly extending wall 10 with the outer wall 3. In the illustrated structure, the wall portion 10 adjacent the inner wall 2 has an inwardly extending rib or flange 11 with the inner edge defining a valve port 12, said rib having a step bore 13 forming outwardly facing shoulders 14 and 15 for sealingly receiving the inner portion 16 of the valve chamber structure 8, as later described. From the shoulders 14 and 15 and the step bore 13 forming same, the wall 10 preferably diverges outwardly to define a progressively increasing bore therein.

The valve chamber structure or housing 8 generally has an outer wall 17 and inner wall 18 that are radially spaced and extend into the bore in the extension with said inner and outer walls of the chamber structure connected as at 19. In the structure illustrated, the inner wall 18 extends outwardly from the connecting portion 19 and then turns inwardly as at 20 terminating as at 21 at an inner portion of a cylindrical or tubular member 22. The tubular member 22 has a bore 23 in which is secured a bushing 24 that serves as a bearing reciprocally mounting a valve stem 25 of a valve 26. The valve 26 has a head 27 with a seat face 28 adapted to engage a valve seat insert 29 of hard wear-resistant material that is removably secured in a seat recess 30 at the inner end or adjacent the connecting portion 19 of the walls of the valve chamber structure. The space from the seat insert 29 defined by the wall 18 and the inner end of the bushing 24 is a passage 31 for gases, as for example exhaust gases, moving through the exhaust port, said space having communication through the outer wall 17 and a connection 32 to an exhaust pipe 32'.

In the structure illustrated, the valve chamber structure 8 has a flange 33 secured to the extension 6 by suitable fastening devices such as screws 34, said screws having shanks 35 that extend through bores 36 in the flange 33 and into threaded sockets 37 in the extension 6. A suitable gasket 38 is interposed between the flange 33 and the face 7 of the extension 6 to form a seal. The outer wall 17 extends from the flange 33 and has an end wall 39 with a central opening 40 that is covered by a plate 41 secured to the wall by suitable fastening devices such as screws 42 with a gasket 43 interposed between the plate 41 and the wall 39 and tubular member 22 to form a water-tight seal whereby the space 44 between the inner and outer walls 17 and 18 form a water chamber or jacket to aid in cooling the portions around the valve.

In the structure illustrated, a bonnet 45 is secured to the wall 39 by suitable fastening devices such as screws 46, and sleeved therein is a valve crosshead 47 that is secured to the valve stem 25 with a valve spring 48 arranged with one end engaging the plate 41 and the other end the crosshead 47 to urge the valve stem outwardly and thereby the head seat face 28 into seating engagement with the seat insert 29 to close the exhaust passage. The valve is actuated by a rocker arm 49 that has one end 50 adapted to engage a valve stem shoe 51, said rocker arm 49 being rotatably mounted on a shaft 52 carried by a support 53 with the other end of said rocker arm operatively connected by a pin 54 with a push rod 55 that is actuated by a cam (not shown) as in conventional practice to open the valve for flow of gas through the port, the spring 48 effecting closing of the valve when the cam is moved to valve-closed position.

The wall 10 has ports 56 providing communication between the cylinder water jacket 5 and the space 57 between the wall 10 and the portion of the outer wall 17 of the valve chamber member between the flange 11 and the outer end of the extension 6. The outer wall portion 17 adjacent the connecting portion 19 has ports 58 communicating the space 57 with the space between the inner and outer walls 17 and 18 whereby water may flow into the water jacket or chamber 44 of the valve chamber structure 8. The inner and outer walls 17 and 18 are relatively supported and connected at spaced intervals by connecting ribs or ties 59 and 60, said ribs or ties being circumferentially spaced whereby they provide substantially no obstruction to flow of water through the water jacket area.

The valve chamber structure is in two separable sections, there being an inner section 61 and an outer section 62. In the illustrated structure, the line of separation between the sections is substantially on the plane of the face 7 of the extension 6 and the webs 59 and 60 are spaced from said line of separation so as to provide support of the outer and inner walls 17 and 18 on each side thereof. The inner section 61 includes the connecting portion 19 and the adjacent wall portions 17 and 18 with the inner end of said section 61 machined as at 63 to provide faces engaging the shoulders 14 and 15 and form a seal with the cylinder wall. The walls 17 and 18 have cooperating end faces 64 and 65 in the plane of separation with formable metal gaskets 66 and 67 between the cooperating faces thereof to form gas- and liquid-tight seals. Each of the walls 17 and 18 have cooperating annular centering ribs or grooves, as for example the outer section 62 has an annular rib 68 adapted to be received in a groove or offset 69 in the inner section 61, and the wall 18 of the outer section has an annular rib 70 adapted to be received in a groove or offset 71 in the inner section. Also, the rib 70 and offset or groove 71 is such that an O-ring or other suitable gasket 72 is received therebetween to cooperate with the gasket 66 in assuring a seal between the discharge chamber 31 and the water jacket or space 44 in the valve chamber structure 8. This provides a structure as illustrated in FIG. 1 wherein the outer section 62, when drawn down tight and in sealed relation with the extension 6, through its engagement with the inner section 61, applies pressure to the seals or gaskets 66, 67 and 72, and also to the shoulders or step arrangement at the inner end of the inner section and the cylinder whereby there is a seal that prevents water leaks from the water jacket.

In using a structure constructed and assembled as described, in the operation of the engine water will move through the space or jacket 5, passages 56, space 57, and through the ports 58 to the water jacket or space 44 that surrounds the wall for the exhaust gas discharge 31. This arrangement provides for cooling water to be immediately surrounding the valve seat insert 29 at the inner end of said inner section 61 to aid in dissipating heat therefrom. If the water space 44 in the valve chamber structure 8 should have accumulation of scale or deposits on the walls thereof, the screws 34 may be removed whereby the valve chamber structure 8 may be removed from the cylinder 1. The inner and outer sections 61 and 62 may then be separated and the large spaces and openings between the walls 17 and 18 of the inner section at the lines of separation of said sections provides ease of access whereby such scale and deposit can be easily removed and the valve chamber structure replaced for continued operation wherein the water circulation will maintain the valve seat insert 29 at suitable temperatures and, upon opening of the valve, exhaust gases are discharged through the space 31 to the exhaust pipe 32'. It is believed that this novel arrangement of a sectional valve chamber with seals and large access openings to the small portions of the water jacket surrounding the valve provides an efficient operative structure from which scale and water deposits can be easily removed and thereby prolong the life of the valve chamber structure.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A valve chamber structure for internal combustion engines having a cylinder with a water jacket and a piston-receiving bore and a boss having a wall extending across said water jacket and defining a flow passage from said piston-receiving bore, comprising, a valve chamber housing having spaced inner and outer walls forming a water chamber therebetween, means securing said housing to said boss in water-tight relation, said inner and outer walls of said housing extending inwardly of said flow passage toward said cylinder and terminating in a closed end of the space therebetween, said closed end engaging the boss wall in a fluid-pressure-tight relation, said inner wall defining a flow passage having an inlet at said end of the housing, valve seat means at said inlet, a valve having a head and a stem, means on said housing supporting said valve for reciprocatory movement to permit the head to engage the valve seat, means actuating said valve between passage-opening and closing positions, passages in said boss wall and said outer wall adjacent the inner end thereof communicating said water jacket of the cylinder with the water chamber in the valve chamber housing, said valve chamber housing having an inner section and an outer section with substantially complementary engaging surfaces adjacent said boss whereby the inner section extends into said flow passage in the boss, and seal means between said complementary edges of the inner and outer walls of said inner and outer sections forming fluid-tight relation therebetween, the spacing between the inner and outer wall at said complementary edges being such that when the sections are separated access is provided through said space to the portion of the valve chamber water jacket in said inner section.

2. A valve chamber structure as set forth in claim 1 wherein the complementary edges of the inner and outer walls of the inner and outer sections have offset portions with formable seal means between said complementary portions.

3. A valve chamber structure for internal combustion engines having a cylinder with a water jacket and a piston-receiving bore and a boss having a wall extending across said water jacket and defining a flow passage from said piston-receiving bore, said wall having outwardly facing seat surfaces, comprising, a valve chamber housing having spaced inner and outer walls forming a water chamber therebetween, means securing said housing to said boss in water-tight relation, said inner and outer walls of said housing extending inwardly of said flow passage toward said cylinder and terminating in a closed end of the space therebetween, said closed end having complementary seat surfaces engaging the seat surfaces of the boss wall in a fluid-pressure-tight relation, said inner wall defining a flow passage having an inlet at said end of the housing, valve seat means at said inlet, a valve having a head and a stem, means on said housing supporting said valve for reciprocatory movement to permit the head to engage the valve seat, means actuating said valve between passage-opening and closing positions, passages in said boss wall and said outer wall providing communication between the water jacket of the cylinder and said water chamber in the valve chamber housing, said valve chamber housing having an inner section and an outer section with substantially complementary engaging surfaces adjacent said boss whereby the inner section extends into said flow passage in the boss, seal means betwen said complementary edges of the inner and outer walls of said inner and outer section forming fluid-tight relation therebetween, and circumferentially spaced webs connecting the inner and outer walls of each of the inner and outer section, the spacing between the inner and outer wall at said complementary edges being such that when the sections are separated access is provided through said space to the portion of the valve chamber water jacket in said inner section.

4. A valve chamber structure as set forth in claim 3 wherein the complementary edges of the inner and outer walls of the inner and outer sections have offset portions, and formable seal means between said complementary sections.

5. A valve chamber structure as set forth in claim 4 wherein said seat surfaces on the boss wall and inner section and the housing securing means are related whereby securing the housing to the boss effects sealing engagement between the said seat surfaces and the seal means at the complementary edges of said inner and outer walls to form fluid-tight seals therebetween.

6. A valve chamber structure for internal combustion engines having a cylinder with a water jacket and a piston-receiving bore and a boss having a wall extending across said water jacket and defining a flow passage from said piston-receiving bore, said wall having outwardly facing seat surfaces, comprising, a valve chamber housing having spaced inner and outer walls forming a water chamber therebetwen, flange means on said housing engaging said boss, means securing said flange means to said boss in water-tight relation to secure said housing thereto, said inner and outer walls of said housing extending inwardly of said flow passage toward said cylinder and terminating in a closed end of the space therebetween, said closed end having complementary seat surfaces engaging the seat surfaces of the boss wall in a fluid-pressure-tight relation, said inner wall defining a flow passage having an inlet at said end of the housing, valve seat means at said inlet, a valve having a head and a stem, means on said housing supporting said valve for reciprocatory movement to permit the head to engage the valve seat, means actuating said valve between passage-opening and closing positions, a space surrounding said outer wall between the flange means and the inner end of the housing to form a water chamber, passages in said boss wall providing communication between the water jacket of the cylinder and said water space, passages in said outer wall adjacent the inner end thereof communicating said water space with the water chamber in the valve chamber housing, said valve chamber housing having an inner section and an outer section with substantially complementary engaging surfaces adjacent said flange means whereby the inner section extends into said flow passage in the boss, seal means between said complementary edges of the inner and outer walls of said inner and outer section forming fluid-tight relation therebetween, and circumferentially spaced webs connecting the inner and outer walls of each of the inner and outer section, the spacing between the inner and outer wall at said complementary edges being such that when the sections are separated access is provided through said space to the portion of the valve chamber water jacket in said inner section.

7. A valve chamber structure as set forth in claim 6 wherein the complementary edges of the inner and outer walls of the inner and outer sections have offset portions with formable seal means between said complementary portions, said seat surfaces on the boss wall and inner section and the flange means being related whereby securing the flange means to the boss effects sealing engagement between the said seat surfaces and the seal means at the complementary edges of said inner and outer walls to form fluid-tight seals therebetween.

8. A valve chamber structure for internal combustion engines having a cylinder with a water jacket and a piston-receiving bore and a boss having a wall extending across said water jacket and defining a flow passage from said piston-receiving bore, said wall having outwardly facing seat surfaces, comprising, a valve chamber housing having an inner section and an outer section, a flange on said outer section engaging said boss, means securing said flange to said boss in water-tight relation to secure said outer section thereto, said outer section having spaced inner and outer walls with end edges adjacent said flange, said inner section having spaced inner and outer walls with outer end edges substantially complementary to the end edge portions of said respective inner and outer walls of the outer section, said inner section having the inner and outer walls extending in spaced relation from said outer end edges toward the piston-receiving bore of the cylinder and terminating in inner end portions that are connected to close the space therebetween, said inner end portions engaging the seat surfaces of said boss wall in fluid-tight relation, said inner wall defining a fluid flow passage to and from said cylinder bore with the inner end being the inlet thereto, a valve seat on said inner end of said inner section, a valve having a head and a stem, means on said inner wall supporting said valve stem for reciprocatory movement of said valve whereby the head engages the valve seat when in closed position, means closing the space between the inner and outer walls of the outer section remote from said cylinder to define a water chamber between said inner and outer walls, and flow passages in the boss wall and outer wall of the inner section for movement of water between the cylinder water jacket and the water chamber in said valve chamber, said spacing between said inner and outer walls at said complementary edges providing access into the water chamber portions therebetween when the valve chamber housing is removed from said cylinder and the inner and outer sections separated.

9. A valve chamber structure for internal combustion engines having a cylinder with a water jacket and a piston-receiving bore and a boss having a wall extending across said water jacket and defining a flow passage from said piston-receiving bore, said wall having outwardly facing seat surfaces, comprising, a valve chamber housing having an inner section and an outer section, a flange on said outer section engaging said boss, means securing said flange to said boss in water-tight relation to secure said outer section thereto, said outer section having spaced inner and outer walls with end edges adjacent said flange and having annular offset portions, said inner section having spaced inner and outer walls with outer end edges with offset portions substantially complementary to the end edge portions of said respective inner and outer walls of the outer section, said inner section having the inner and outer walls extending in spaced relation from said outer end edges toward the piston-receiving bore of the cylinder and terminating in inner end portions that are connected to close the space therebetween, said inner end portions having seat surfaces engaging the seat surfaces of said boss wall in fluid-tight relation, said inner wall defining a fluid flow passage to and from said cylinder bore with the inner end being the inlet thereto, a valve seat on said inner end of said inner section, a valve having a head and a stem, means on said inner wall supporting said valve stem for reciprocatory movement of said valve whereby the head engages the valve seat when in closed position, means closing the space between the inner and outer walls of the outer section remote from said cylinder to define a water chamber between said inner and outer walls, flow passages in the boss wall and outer wall of the inner section for movement of water between the cylinder water jacket and the water chamber in said valve chamber, and a plurality of circumferentially spaced webs connecting said inner and outer walls of said inner and outer sections adjacent the complementary end edges thereof, said spacing between said inner and outer walls at said complementary edges providing access into the water chamber portions therebetween when the valve chamber housing is removed from said cylinder and the inner and outer sections separated.

References Cited in the file of this patent

UNITED STATES PATENTS

| | | |
|---|---|---|
| 1,083,265 | Baumann | Dec. 30, 1913 |
| 1,796,716 | Lehn | Mar. 17, 1931 |
| 1,893,209 | Parkhill | Jan. 3, 1933 |